US010069309B2

(12) United States Patent
Muccini et al.

(10) Patent No.: US 10,069,309 B2
(45) Date of Patent: Sep. 4, 2018

(54) CONTROLLING REDUNDANT POWER SUPPLIES IN AN INFORMATION HANDLING SYSTEM

(71) Applicant: DELL PRODUCTS, L.P., Round Rock, TX (US)

(72) Inventors: Mark A. Muccini, Georgetown, TX (US); Lei Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 257 days.

(21) Appl. No.: 14/922,154

(22) Filed: Oct. 24, 2015

(65) Prior Publication Data
US 2017/0117715 A1 Apr. 27, 2017

(51) Int. Cl.
H02J 3/00 (2006.01)
H02J 5/00 (2016.01)

(52) U.S. Cl.
CPC ...................................... H02J 5/00 (2013.01)

(58) Field of Classification Search
CPC ........................................................ H02J 5/00
See application file for complete search history.

(56) References Cited

U.S. PATENT DOCUMENTS

| 7,793,005 | B1* | 9/2010 | Fernald | G06F 1/26 323/222 |
| 8,907,642 | B1* | 12/2014 | Burstein | H02M 3/1584 323/272 |
| 9,088,221 | B2* | 7/2015 | Lai | H02M 3/33523 |
| 9,548,619 | B2* | 1/2017 | Gazit | H02J 7/0018 |
| 9,608,518 | B2* | 3/2017 | Yin | H02M 3/155 |
| 9,748,830 | B1* | 8/2017 | Soleno | H02M 1/08 |
| 2005/0127882 | A1 | 6/2005 | Pan et al. | |
| 2007/0040657 | A1* | 2/2007 | Fosler | H02J 1/08 340/333 |
| 2007/0179723 | A1 | 8/2007 | Kasprzak et al. | |
| 2011/0254526 | A1 | 10/2011 | Luo et al. | |
| 2012/0256659 | A1 | 10/2012 | Kiadeh et al. | |
| 2013/0067259 | A1* | 3/2013 | Freiwald | G06F 1/3293 713/323 |
| 2013/0099766 | A1 | 4/2013 | Luo et al. | |
| 2013/0187473 | A1* | 7/2013 | Deboy | H02M 7/49 307/82 |
| 2014/0252863 | A1* | 9/2014 | Patel | H02J 3/44 307/82 |

(Continued)

Primary Examiner — Jared Fureman
Assistant Examiner — Esayas Yeshaw
(74) Attorney, Agent, or Firm — Isidore PLLC

(57) ABSTRACT

A power supply system comprises a first power supply including a first converter for providing a first output voltage and a first micro-controller coupled to a first switch. The first switch is coupled to a common share bus. A second power supply includes a second converter for providing a second output voltage and a second micro-controller coupled to a second switch. The second switch is also coupled to the common share bus. The first micro-controller is configured to receive a first control signal designating the first power supply to be either a master power supply or a slave power supply and the second micro-controller is configured to receive a second control signal designating the second power supply to be either the master power supply or the slave power supply.

18 Claims, 9 Drawing Sheets

(56) References Cited

U.S. PATENT DOCUMENTS

2014/0319128 A1* 10/2014 Paull ...................... H05B 6/065
                                                              219/664
2014/0359331 A1    12/2014 Kuan
2016/0211765 A1*   7/2016 Han ........................ H02M 7/42
2017/0070150 A1*   3/2017 Kim ........................ H02M 1/42

* cited by examiner

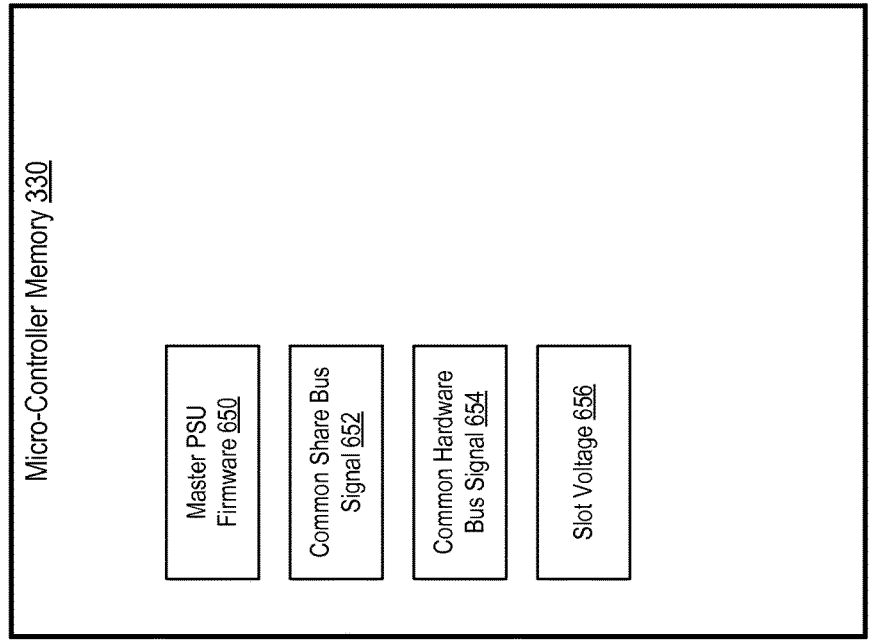
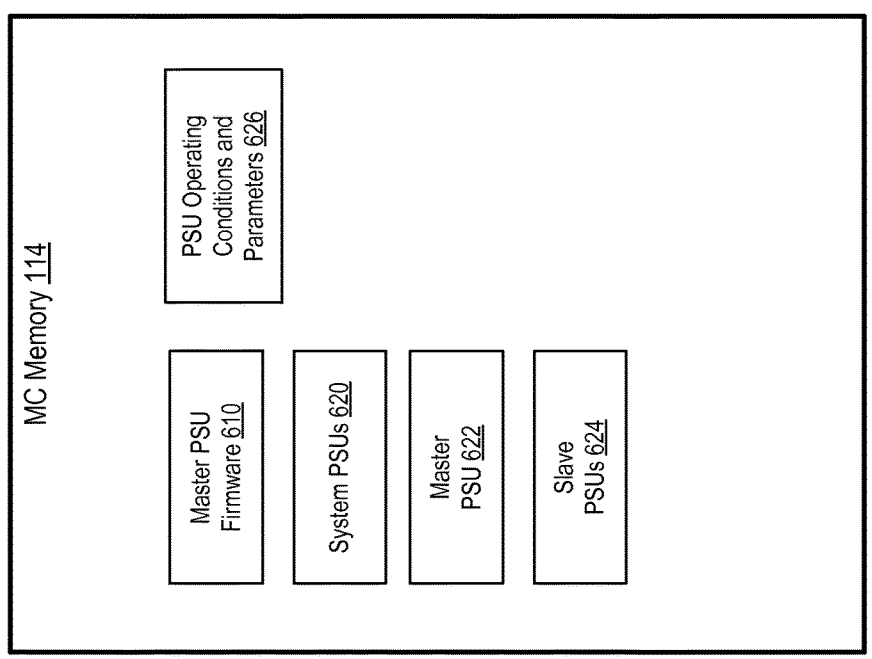
FIG. 6B
FIG. 6A

CONTROLLING REDUNDANT POWER SUPPLIES IN AN INFORMATION HANDLING SYSTEM

BACKGROUND

1. Technical Field

The present disclosure generally relates to information handling systems and in particular to controlling redundant power supplies in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a number of redundant alternating current to direct current (AC-DC) or direct current to direct current (DC-DC) power supplies that provide regulated voltages to different loads. The load current may vary across a broad range from relatively high peak currents to very low stable currents. The AC-DC and DC-DC power supplies used in servers typically should be designed for a large range of server configurations and generally need to be designed to handle the full load of the server safely, and also need to be optimized for efficiency, size, and cost.

Most redundant power solutions require a level of load or power sharing between the individual power supplies. To ensure that availability and redundancy of the power supplies are maintained, the sharing solution requires load balance accuracy, as well as a high degree of stability. One method of power sharing uses an active current sharing method that includes a common share bus that is connected to all of the power supplies. The stability of the active current sharing method depends on each power supply's output impedance, the intermediate impedance between the power supplies, and the compatibility between different power supply designs.

The active current sharing method can use a methodology commonly termed as "Master-Slave". The master power supply determines the voltage on the common share bus which is proportional to its own output current. The slave power supplies attempt to follow the master output current by reading the common share bus voltage. Under conditions, in which the power supplies share a common output rail and have limited design margin, an oscillatory behavior can be observed. Unfortunately, the oscillating behavior between the power supplies can result in an increase in output voltage, which is referred to as "voltage walking", which results from a master-slave power supply role change, and causes loss of current sharing.

BRIEF SUMMARY

Disclosed are a power supply system, an information handling system (IHS) and a method of operating a power supply system to control redundant power supplies in an IHS. According to one embodiment, the power supply system comprises a first power supply including a first converter for providing a first output voltage and a first micro-controller coupled to a first switch. The first switch is coupled to a common share bus. A second power supply includes a second converter for providing a second output voltage and a second micro-controller coupled to a second switch. The second switch is coupled to the common share bus. The first micro-controller is configured to receive a first control signal designating the first power supply to be either a master power supply or a slave power supply and the second micro-controller is configured to receive a second control signal designating the second power supply to be either the master power supply or the slave power supply. The first micro-controller turns on the first switch when the first control signal designates the first power supply as the master power supply, such that the first power supply sets the voltage on the common share bus and the second power supply is designated as the slave power supply and the second switch remains in the off position. The second micro-controller turns on the second switch when the second control signal indicates that the second power supply is to be the master power supply, such that the second power supply sets the voltage on the common share bus and the first power supply is designated as the slave power supply and the first switch remains in the off position.

Also disclosed is an IHS that comprises at least one processing node having at least one central processing unit (CPU). A first power supply includes a first converter for providing power to the processing node and a first micro-controller coupled to a first switch. The first switch is coupled to a common share bus. A second power supply includes a second converter for providing power to the processing node and a second micro-controller coupled to a second switch. The second switch is coupled to the common share bus. The first micro-controller is configured to receive a first control signal designating the first power supply to be either a master power supply or a slave power supply and the second micro-controller is configured to receive a second control signal designating the second power supply to be either the master power supply or the slave power supply.

According to another embodiment, a method of operating a power supply system is disclosed. The method includes receiving a first control signal at a first micro-controller of a first power supply and determining if the first control signal identifies the first power supply as a master power supply. In response to determining that the first control signal has identified the first power supply as the master power supply, a first switch coupled between the first micro-controller and a common share bus is turned on such that the first power supply is configured as a master power supply that sets the voltage on the common share bus.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6A is a block diagram illustrating example contents of the management controller memory, in accordance with one embodiment;

FIG. 6B is a block diagram illustrating example contents of the micro-controller memory, in accordance with one embodiment;

DETAILED DESCRIPTION

Figure 1:
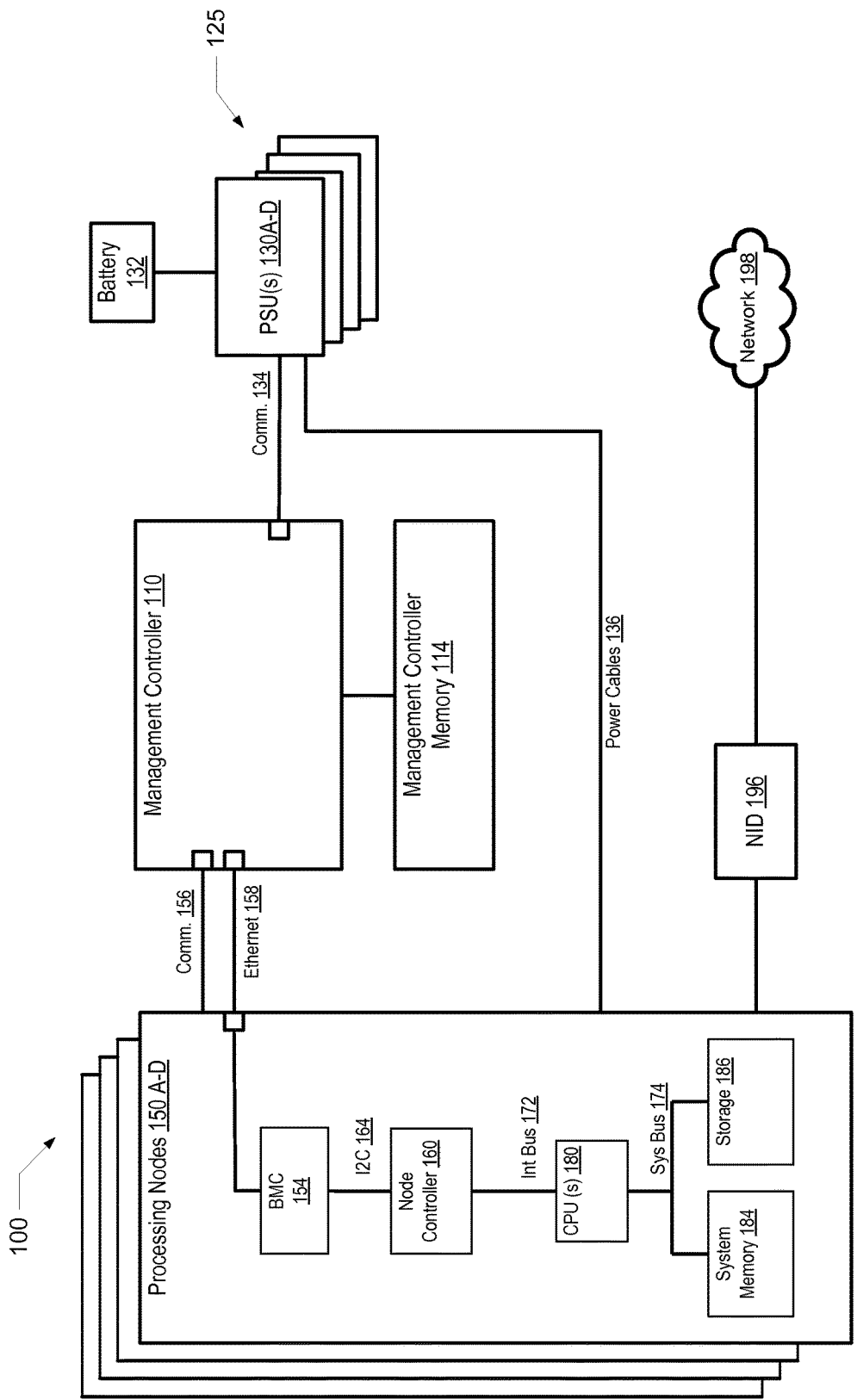
FIG. 1 is a block diagram illustration of an example information handling system (IHS), according to one or more embodiments.

The illustrative embodiments provide a power supply system, an information handling system (IHS), and a method performed within the IHS to control redundant power supplies.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Further, those of ordinary skill in the art will appreciate that the hardware components and basic configuration depicted in the various figures (e.g. FIG. 1) and described herein may vary. For example, the illustrative components within IHS 100 (FIG. 1) are not intended to be exhaustive, but rather are representative to highlight components that can be utilized to implement various aspects of the present disclosure. For example, other devices/components/modules may be used in addition to or in place of the hardware and software modules depicted. The depicted examples do not convey or imply any architectural or other limitations with respect to the presently described embodiments and/or the general disclosure.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 1, IHS 100 comprises an arrangement of multiple computing or processing nodes along with power components. IHS 100 includes a management controller (MC) 110 that is communicatively coupled to processing nodes 150A-D via communication bus 156, such as an I2C bus, and an Ethernet bus or cable 158. The communication hardware and software protocol are for reference only and the end solution can use different methods to achieve similar functionality. The plurality of computing or processing nodes 150 are individually labeled as processing nodes A-D 150A-D. MC 110 is coupled to MC memory 114. MC memory 114 can be flash or other form of memory.

IHS 100 includes a power subsystem 125. Power subsystem 125 includes a plurality of power supply units (PSUs) 130A-D and a backup battery 132. Backup battery 132 provides power to IHS 100 in the event of a loss of AC power or the failure of one or more PSUs 130A-D. MC 110 is in communication with PSUs 130A-D via a communication bus 134. PSUs 130A-D supply power to each of the processing nodes and other components within IHS 100 that require power via either one or more bus bars, PCB traces or power cables 136. MC 110 can receive power supply data, capacity and settings from PSUs 130A-D via communication bus 134 or other alternative communication methods.

In one implementation, each of the processing nodes 150A-D has a board management controller (BMC) 154. BMC 154 is coupled to MC 110 via an Ethernet cable 158. Ethernet cable 158 carries data and signals between MC 110 and BMC 154. Specifically, according to at least one embodiment, MC 110 provides certain control and/or management signals to the processing nodes 150A-D via communication bus 156 and one or more select wires within Ethernet cable 158. In one embodiment, MC 110 can send and receive data signals at a relatively fast rate via the dedicated communication bus 156 or can send and receive data signals at a relatively slower rate via the Ethernet bus 158, depending on the desired data transfer rate.

Each of the processing nodes 150A-D includes a node controller 160 (collectively node controllers 160A-D). Node controller 160 is communicatively coupled to BMC 154 via I2C bus 164. Node controller 160 is further coupled to one or more central processing units (CPU) 180 via an interface bus 172. The CPUs support processing of data and information within each of the processing nodes. CPU 180 is communicatively coupled to system memory 184 and one more storage devices 186 via a system bus 174.

IHS 100 further comprises a network interface device (NID) 196 that is communicatively coupled to each of processing nodes 150A-D. NID 196 enables IHS 100 to communicate and/or interface with other devices, services, and components that are located external to IHS 100. These devices, services, and components can interface with IHS 100 via an external network, such as example network 198, using one or more communication protocols. In one embodiment, a customer provisioned system/platform comprises multiple devices located across a distributed network, and NID 196 enables IHS 100 to be connected to these other devices. Network 198 can be a local area network, wide area network, personal area network, and the connection to and/or between network and IHS 100 can be wired or wireless or a combination thereof. For purposes of discussion, network 198 is indicated as a single collective component for simplicity. However, it is appreciated that network 198 can comprise one or more direct connections to other devices as well as a more complex set of interconnections as can exist within a wide area network, such as the Internet.

Figure 2:
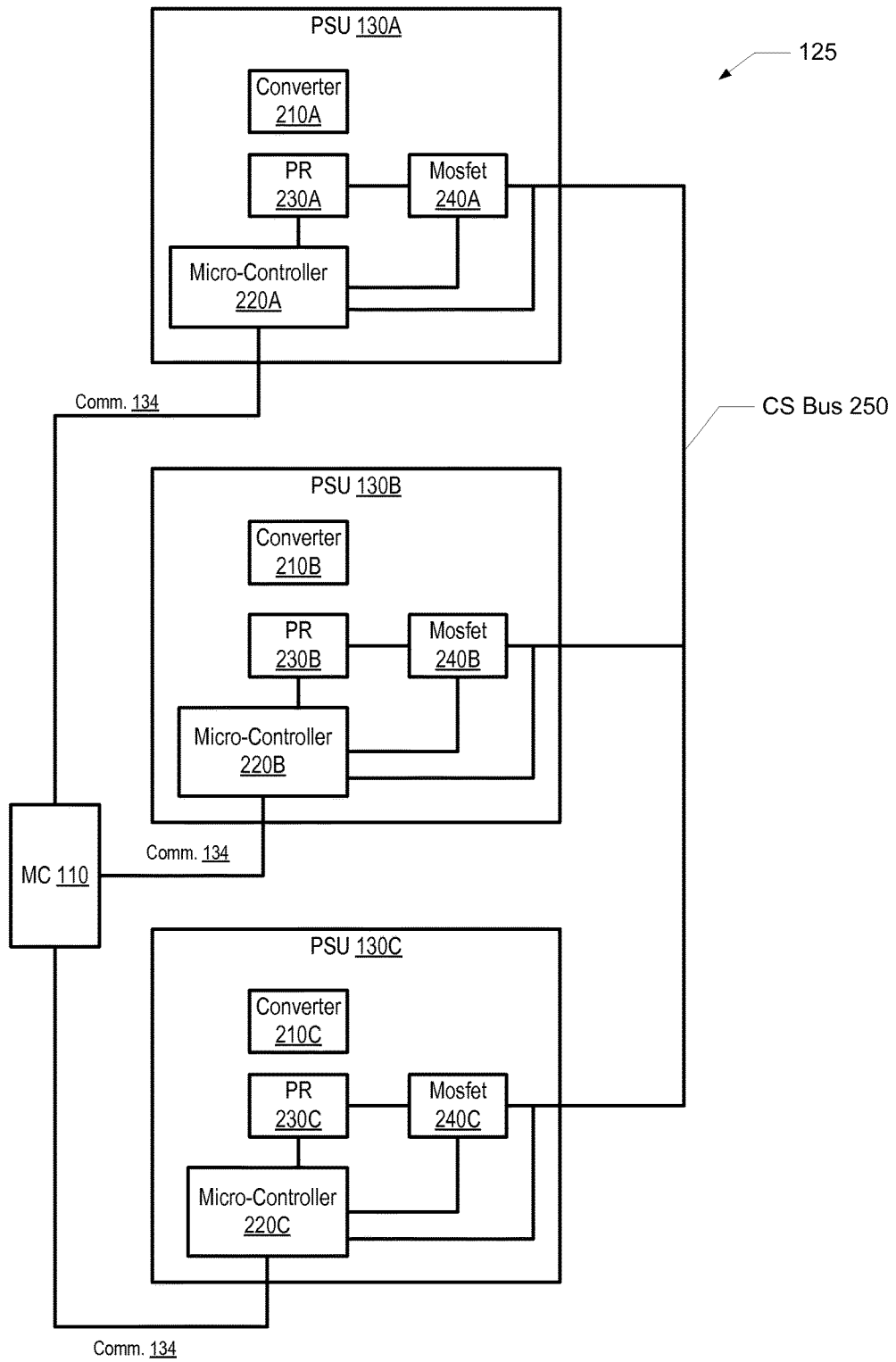
FIG. 2 is a block diagram illustrating details of a power management subsystem in an IHS, in accordance with one embodiment.

FIG. 2 illustrates further details of power subsystem 125 operating within IHS 100 to implement selecting a master PSU from among PSUs 130A-D. Referring specifically to FIG. 2, power subsystem 125 comprises PSU 130A, 130B and 130C that are communicatively coupled to MC 110 via communication bus 134. PSU 130A includes a converter 210A, micro-controller 220A, precision rectifier (PR) 230A and a switch, such as a metal oxide semiconductor field effect transistor (MOSFET) 240A. For this embodiment, the output is the drain connection of MOSFET 240A and is coupled to a common share bus 250. Converter 210A is a circuit such as an AC to DC or DC to DC converter that converts one voltage type and/or level to another. Micro-controller 220A is coupled to MC 110, PR 230A and the common share bus 250. PR 230A is further coupled to MOSFET 240A. PR 230A, which is also known as a super diode, is a circuit that includes an operational amplifier in order to have the circuit behave like an ideal diode and rectifier.

PSU 130B includes a converter 210B, micro-controller 220B, precision rectifier (PR) 230B and metal oxide semiconductor field effect transistor (MOSFET) 240B. The output of MOSFET 240B is coupled to the common share bus 250. Micro-controller 220B is coupled to MC 110, PR 230B, and the common share bus 250. PR 230B is further coupled to MOSFET 240B.

PSU 130C includes a converter 210C, micro-controller 220C, precision rectifier (PR) 230C and metal oxide semiconductor field effect transistor (MOSFET) 240C. The output of MOSFET 240C is coupled to the common share bus 250. Micro-controller 220C is coupled to MC 110, PR 230C, and the common share bus 250. PR 230C is further coupled to MOSFET 240C. In one embodiment, switches 240A-C can be transistors.

In one embodiment, one of the PSUs 130A-C can be designated a "Master" and the remaining PSUs designated as "Slaves". The master PSU determines the voltage on the common share bus 250, which voltage is proportional to its output current. The slave PSUs attempt to follow the desired output current by reading the common share bus voltage and adjusting their own output voltage, ultimately balancing the current across each power supply. The output of each of the MOSFETs 240A-C is coupled to the common share bus 250. Micro-controllers 220A-C can read the voltage on the common share bus 250 and trigger converters 210A-C to adjust the output current level according to the magnitude of the common share bus voltage and ultimately balancing the current delivery across converters 210A-C In one embodiment, each of the micro-controllers 220A-C are configured to receive a control signal from MC 110 via communication bus 134 designating one of the PSUs (i.e. PSU 130A) to be a master power supply and the other PSUs (i.e. PSUs 130B-C) to be slave PSUs. As one example, based on the received control signals, micro-controller 220A can turn on MOSFET 240A and micro-controllers 220B-C can turn off MOSFETs 240B-C such that PSU 130A is the master PSU that sets the voltage on the common share bus 250. Because MOSFETs 240B-C are turned off, PSUs 130B-C are slave PSUs and cannot overtake the voltage level on common share bus 250. PSUs 130B-C read the voltage on the common share bus 250 and adjust their output current based on the voltage level on common share bus 250.

Figure 3:
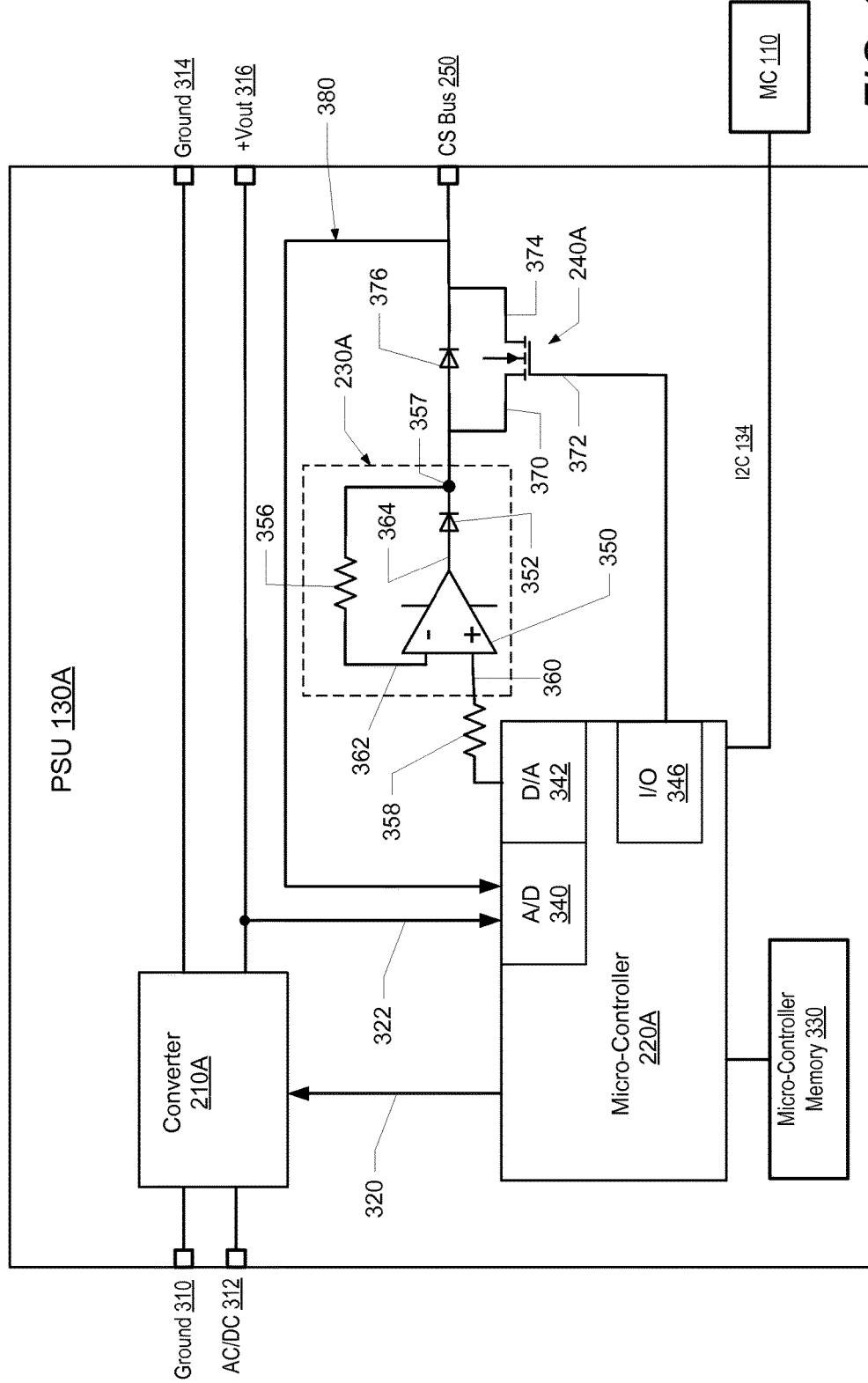
FIG. 3 is a block diagram illustrating details of a power supply unit, in accordance with one embodiment.

Referring to FIG. 3, further details of the PSUs and specifically PSU 130A are illustrated. PSU 130A includes converter 210 having an input/earth ground terminal 310 and an AC/DC input power terminal 312. Converter 210 further has an output ground terminal 314 and a +Vout terminal 316. +Vout terminal 316 can supply a controlled current to IHS 100. Converter 210 is coupled to micro-controller 220A by an internal bus 320. Micro-controller 220A includes an analog to digital (A/D) converter 340, a digital to analog (D/A) converter 342 and an input/output (I/O) module 346. A/D converter 340 is coupled to +Vout terminal 316 by a circuit line 322 allowing micro-controller 220A to sense and sample the output voltage and current of converter 210A. For simplicity of illustration, the current sense element used by circuit line 322 is implied. Micro-controller 220A is further coupled to micro-controller memory 330. In one embodiment, micro-controller memory 330 can be a non-volatile or flash memory device.

PR 230A comprises an operational amplifier (OPAMP) 350, a diode 352, and a resistor 356. OPAMP 350 has a positive input terminal 360, a negative input terminal 362 and an output terminal 364. Operational amplifier 350 and associated feedback components are specific to this implementation, but alternative methods can be used to achieve similar functionality. A resistor 358 is coupled between D/A converter 342 and positive input terminal 360. Diode 352 has an anode coupled to output terminal 364 and a cathode coupled to node 357. Resistor 356 is coupled between negative input terminal 362 and node 357. MOSFET 240A has a gate 372, a source 370 and a drain 374. Gate 372 is coupled to I/O module 346. Source 370 is coupled to node 357 and drain 374 is coupled to common share bus 250. Diode 376 has an anode coupled to source 370 and a cathode coupled to drain 374 and to the common share bus 250. A circuit line 380 is coupled between common share bus 250 and A/D 340, allowing micro-controller 220A to sense and sample the voltage on common share bus 250. In one embodiment, MOSFET 240A can be replaced by a transistor having a base coupled to MC 220A via I/O module 346, a collector coupled to PR 230A, and an emitter coupled to common share bus 250.

During operation, if micro-controller 220A receives a control signal from MC 110 designating PSU 130A as a master PSU, micro-controller 220A turns on MOSFET 240 via I/O module 346 and gate 372 resulting in an almost zero voltage drop across MOSFET 240 and diode 376. PR 230A provides an output voltage that effectively is the voltage on the common share bus 250. If micro-controller 220A receives a control signal from MC 110 designating PSU 130A as a slave PSU, micro-controller 220A turns off MOSFET 240 via I/O module 346 and gate 372. In this mode, the PSU can only drive the current share bus 250 through the body diode (internal to MOSFET 240) or diode 376 and is prohibited from driving the common share bus 250 due to the additional diode voltage drop (e.g. 0.7V) below the voltage on the common share bus.

Figure 4:
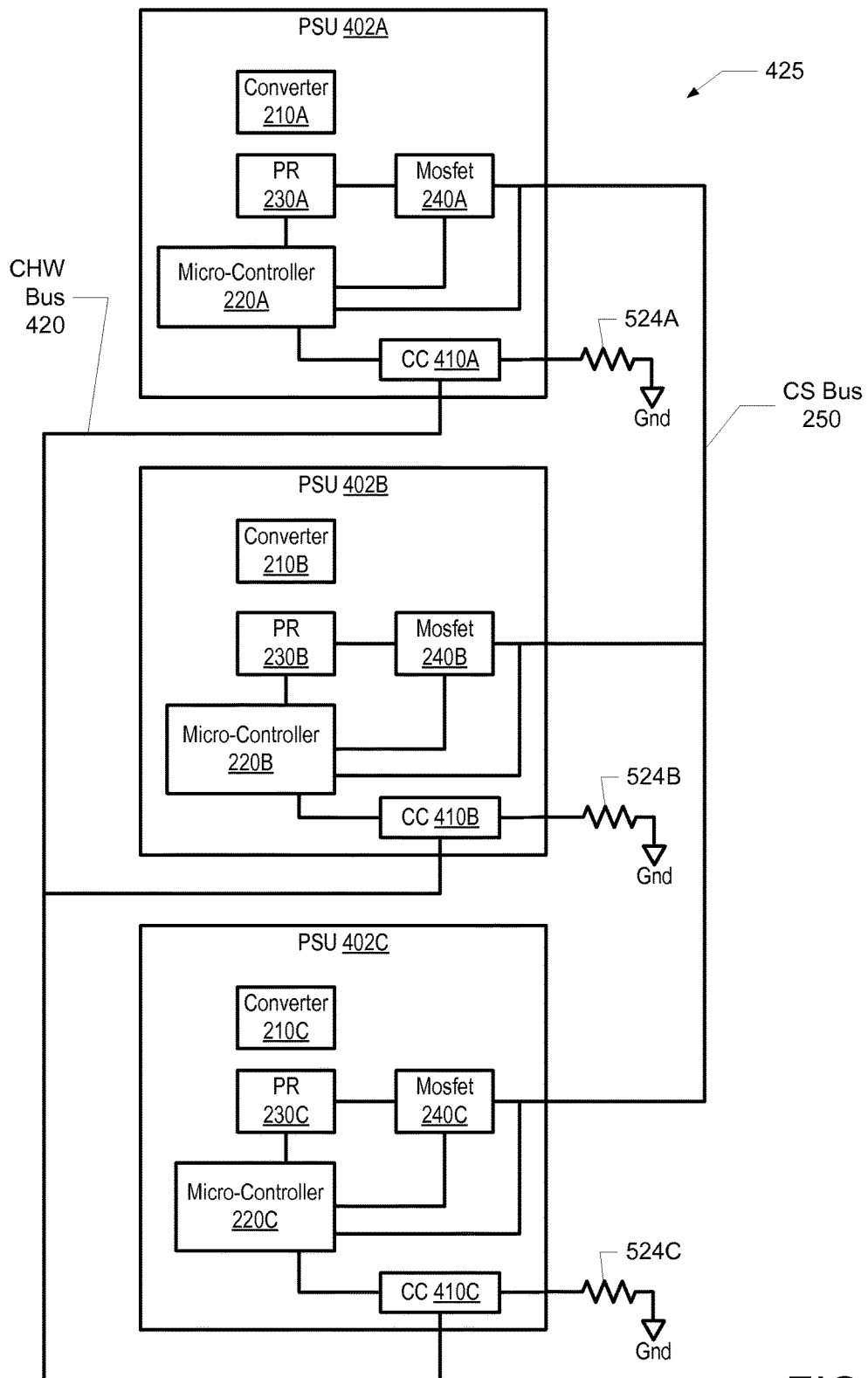
FIG. 4 is a block diagram illustrating details of another power management subsystem in an IHS, in accordance with one embodiment.

FIG. 4 illustrates details of another embodiment of a power subsystem 425 operating within IHS 100 to implement selecting a master PSU from among PSUs 402A-C. Referring to FIG. 4, power subsystem 425 comprises PSU 402A, 402B, and 402C. PSU 402A includes a converter 210A, micro-controller 220A, precision rectifier (PR) 230A, metal oxide semiconductor field effect transistor (MOSFET) 240A and control circuit (CC) 410A. The output of MOSFET 240A is coupled to a common share bus 250. Converter 210A is a circuit such as an AC to DC or DC to DC converter that converts one voltage type and/or level to another. Micro-controller 220A is coupled to MC 110, PR 230A, the common share bus 250, and CC 410A. PR 230A is further coupled to MOSFET 240A. PR 230A, which is also known as a super diode, is a circuit that includes an operational amplifier in order to have the circuit behave like an ideal diode and rectifier. CC 410A is coupled to a common hardware bus 420 and a first resistor 524A is coupled between CC 410A and ground. First resistor 524A is external to PSU 402A.

PSU 402B includes a converter 210B, micro-controller 220B, precision rectifier (PR) 230B, metal oxide semiconductor field effect transistor (MOSFET) 240B and CC 410B. The output of MOSFET 240B is coupled to the common share bus 250. Micro-controller 220B is coupled to MC 110, PR 230B, the common share bus 250, and CC 410B. PR 230B is further coupled to MOSFET 240B. CC 410B is coupled to a common hardware bus 420 and a second resistor 524B is coupled between CC 410B and ground. Second resistor 524B is external to PSU 402B.

PSU 402C includes a converter 210C, micro-controller 220C, precision rectifier (PR) 230C, metal oxide semiconductor field effect transistor (MOSFET) 240C and CC 410C. The output of MOSFET 240C is coupled to the common share bus 250. Micro-controller 220C is coupled to MC 110, PR 230C, the common share bus 250, and CC 410C. PR 230C is further coupled to MOSFET 240C. CC 410C is coupled to a common hardware bus 420 and a third resistor 524C is coupled between CC 410C and ground. Third resistor 524C is external to PSU 402C.

The output of each of the MOSFETs 240A-C is coupled to the common share bus 250. The voltage level on the common share bus is proportional to the output current being provided by the "Master" PSU, by which all "Slave" PSUs will compensate their output current in a manner to match the common share bus value. Micro-controllers 220A-C can read the voltage on the common share bus 250 and trigger converters 210A-C to adjust the output current level according to the magnitude of the common share bus voltage. In one embodiment, one of the PSUs can be designated a "Master" and the other PSUs can be designated as a "Slave". The master PSU determines the voltage on the common share bus 250 which is proportional to the "Master" output current. The slave PSUs attempt to follow the desired output current by reading the common share bus voltage and adjusting their individual output voltage accordingly.

In one embodiment, each of the micro-controllers 220A-C is configured to receive a respective control signal from respective CCs 410A-C. Micro-controllers 220A-C each compare the voltage received from CCs 410A-C to the voltage on the common hardware bus 420 in order to determine if their respective PSUs are master or slave PSUs. Based on the results of the comparison, micro-controller 220A can turn on MOSFET 240A and micro-controllers 220B-C can turn off MOSFETs 240B-C, such that PSU 402A is the master PSU that sets the voltage on the common share bus 250. Because MOSFETs 240B-C are turned off, PSUs 402B-C are slave PSUs and cannot influence the voltage level on common share bus 250.

Figure 5:
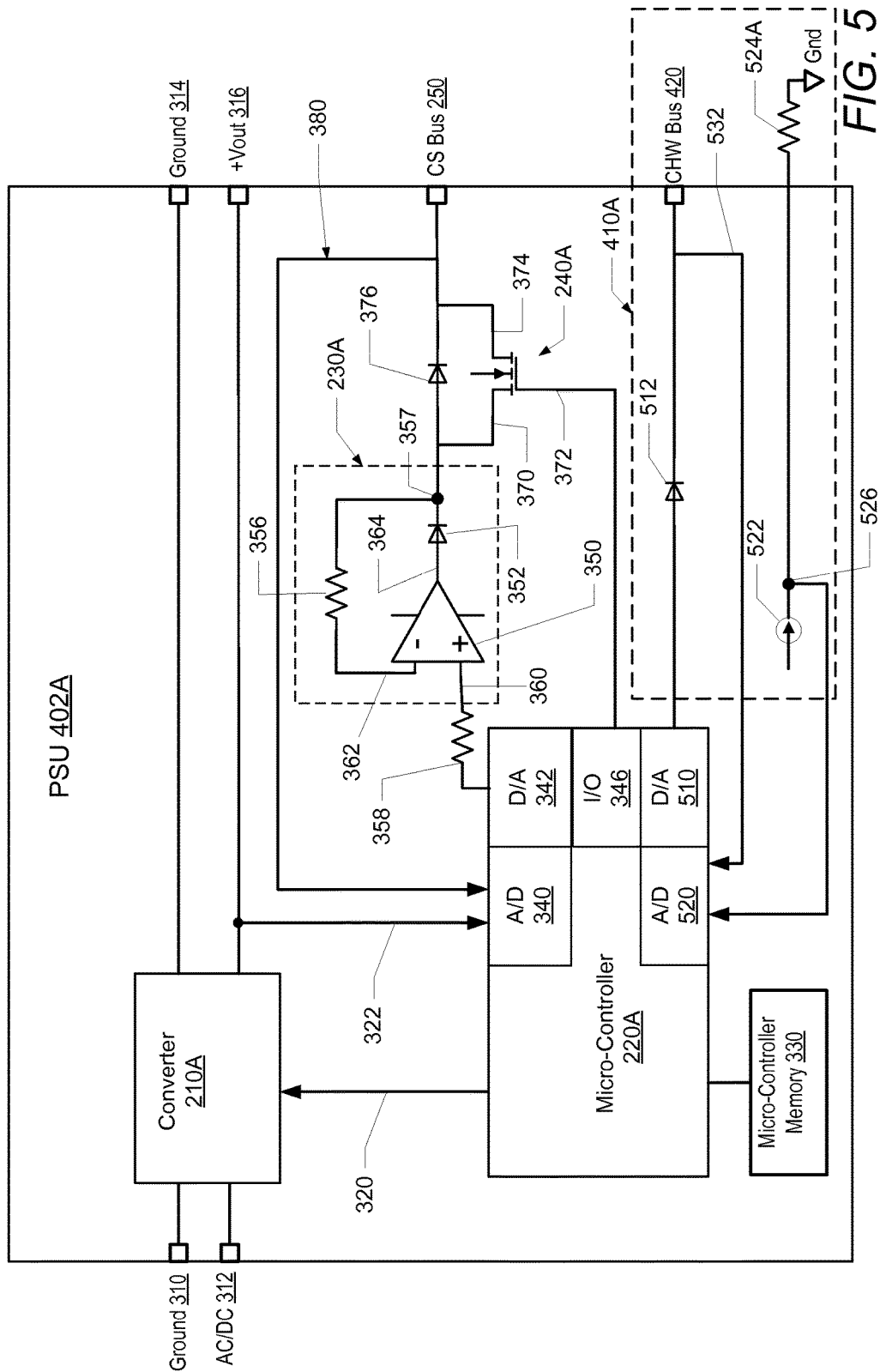
FIG. 5 is a block diagram illustrating details of another power supply unit, in accordance with one embodiment.

Referring to FIG. 5, further details of the PSUs and specifically PSU 402A are illustrated. PSU 402A includes converter 210A having an input ground terminal 310 and an AC/DC input power terminal 312. Converter 210A further has an output ground terminal 314 and an +Vout terminal 316. The +Vout terminal 316 can supply a controlled current to IHS 100. Converter 210A is coupled to micro-controller 220A by an internal bus 320. Micro-controller 220A includes an analog to digital (A/D) converter 340, a digital to analog (D/A) converter 342, an input/output (I/O) module 346, a D/A 510, and an A/D 520. A/D converter 340 is coupled to +Vout terminal 316 by a circuit line 322, allowing micro-controller 220A to sense and sample the output voltage and current of converter 210A. Micro-controller 220A is further coupled to micro-controller memory 330. In one embodiment, micro-controller memory 330 can be a non-volatile or flash memory device.

PR 230A comprises an operational amplifier (OPAMP) 350, a diode 352 and a resistor 356. OPAMP 350 has a positive input terminal 360, a negative input terminal 362 and an output terminal 364. A resistor 358 is coupled between D/A converter 342 and positive input terminal 360. Diode 352 has an anode coupled to output terminal 364 and a cathode coupled to node 357. Resistor 356 is coupled between negative input terminal 362 and node 357. MOSFET 240A has a gate 372, a source 370 and a drain 374. Gate 372 is coupled to I/O module 346. Source 370 is coupled to node 357, and drain 374 is coupled to common share bus 250. Diode 376 has an anode coupled to source 370 and a cathode coupled to drain 374 and to the common share bus 250. A circuit line 380 is coupled between common share bus 250 and A/D 340, allowing micro-controller 220A to sense and sample the voltage on common share bus 250.

CC 410A includes a diode 512, a current source 522 and a first resistor 524A that is located outside of PSU 402A. Diode 512 has an anode coupled to D/A 510 and a cathode coupled to common hardware bus 420. The output of current source 522 is coupled to a node 526 that is coupled to A/D 520 and to one end of first resistor 524A. The other end of first resistor 524A is coupled to ground. A/D 520 is also connected to the common hardware bus 420 by circuit line 532. First resistor 524A is the resistor that the system uses to designate the PSU bay. The PSU uses a constant current source or resistor ladder to read voltage node 526, which sets the voltage on D/A 510. The PSU compares the voltage on the CHW Bus 420 to that of D/A 510 to determine if the PSU is the master PSU or a slave PSU. CCs 410B and 410C (FIG. 4) include resistors 524B and 524C (not shown). Power subsystem 425 uses resistors 524A, 524B and 524C to select the "Master" PSU and the "Slave" PSUs. Each of the resistors 524A, 524B, and 524C have different pre-determined resistance values such that if the level of current source 522 is constant, then the voltage sensed and received by A/D 520 is different for each of the PSUs 402A-C. For example, in one embodiment, first resistor 524A can have a value of 10K ohms, second resistor 524B can have a value of 5K ohms and third resistor 524C can have a value of 2K ohms.

During operation, micro-controller 220A senses the voltage (control signal) at node 526 via A/D 520 and compares this voltage level to the voltage on the common hardware bus 420, as sensed at circuit line 532. If the voltage at node 526 is equal to or greater than the voltage on the common hardware bus 420, micro-controller 220A determines that PSU 402A is a master PSU and turns on MOSFET 240A via I/O module 346 and gate 372, resulting in an almost zero voltage drop across MOSFET 240A and diode 376. PR 230A provides an output voltage that effectively is the voltage on the common share bus 250. If the voltage at node 526 is less than the voltage on the common hardware bus 420, micro-controller 220A determines that PSU 402A is a slave PSU and turns off MOSFET 240A via I/O module 346 and gate 372. In this mode, the PSU can only drive the current share bus 250 through the body diode (internal to MOSFET 240A) or diode 376 and is prohibited from driving the common share bus 250 due to the additional diode voltage drop (e.g. 0.7V) below the voltage on the common share bus.

FIGS. 6A and 6B illustrate details of the contents of MC memory 114 and micro-controller memory 330. The description of FIGS. 6A and 6B is made with general reference to the specific components illustrated within the preceding FIGS. 1-5. With specific reference to FIG. 6A, MC memory 114 stores master PSU firmware 610. Master PSU firmware 610 executing on MC 110 can determine which of PSUs 130A-C are master PSUs and which are slave PSUs. MC memory 114 further stores a list of all of the system PSUs 620 in IHS 100, the current master PSU 622 and the slave PSUs 624. MC memory 114 can also store PSU operating conditions and parameters 626 for each of the PSUs. For example, PSU operating conditions and parameters 626 can include an indicator if the PSU has a good operating condition for each of the PSUs.

Referring to FIG. 6B, micro-controller memory 330 stores master PSU firmware 650. Master PSU firmware 650 executing on each of micro-controllers 220A-C can determine for each of PSUs 402A-C if the PSU is a master PSU or a slave PSU. Micro-controller memory 330 further stores the common share bus signal voltage 652 sensed from the common share bus 250, the common hardware bus signal voltage 654 sensed from the common hardware bus 420, and the slot voltage 656 sensed at node 526.

Figure 7:
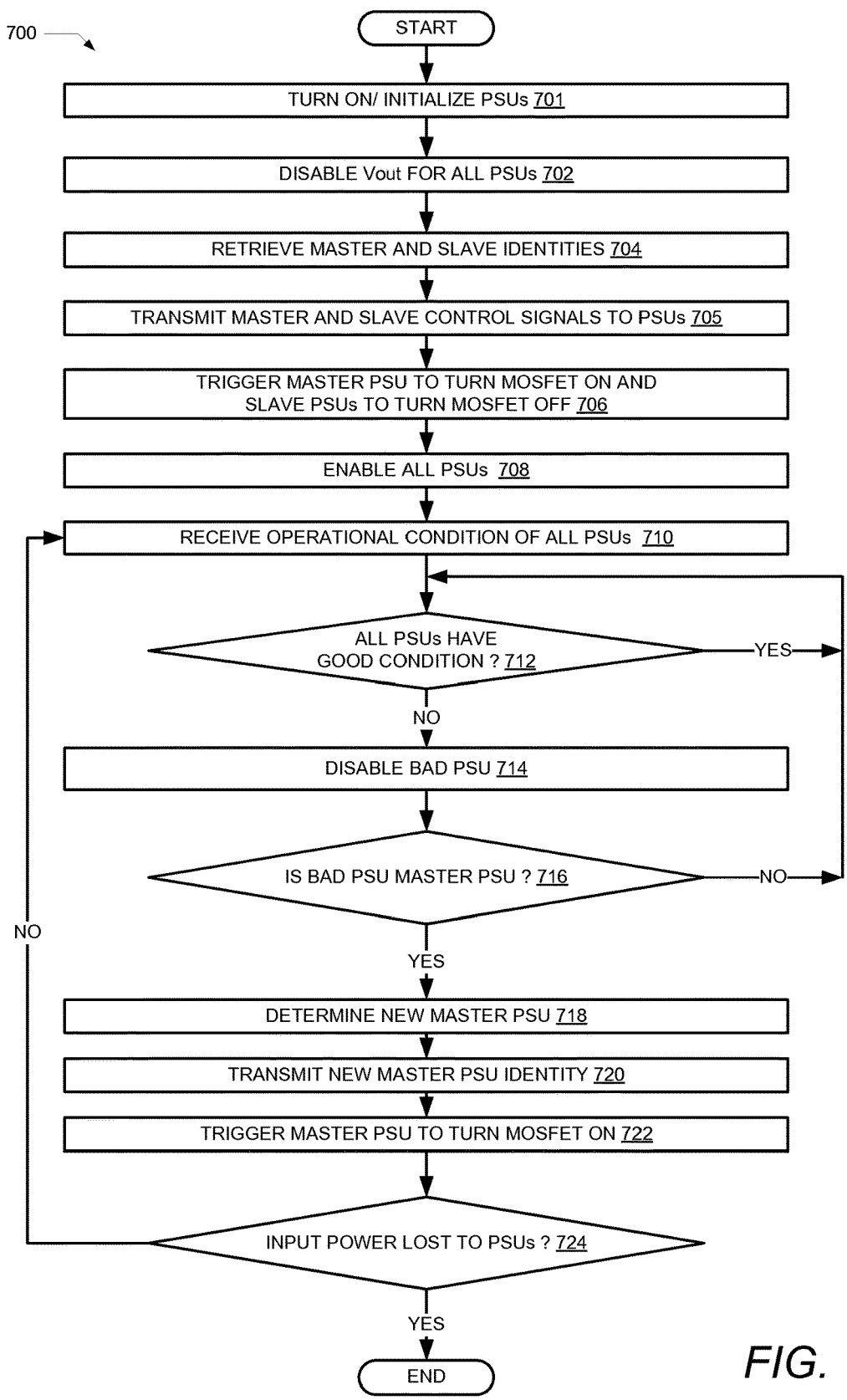
FIG. 7 is a flow chart illustrating one example of the method by which a management controller selects master and slave power supplies in an IHS, according to one or more embodiments.
Figure 8:
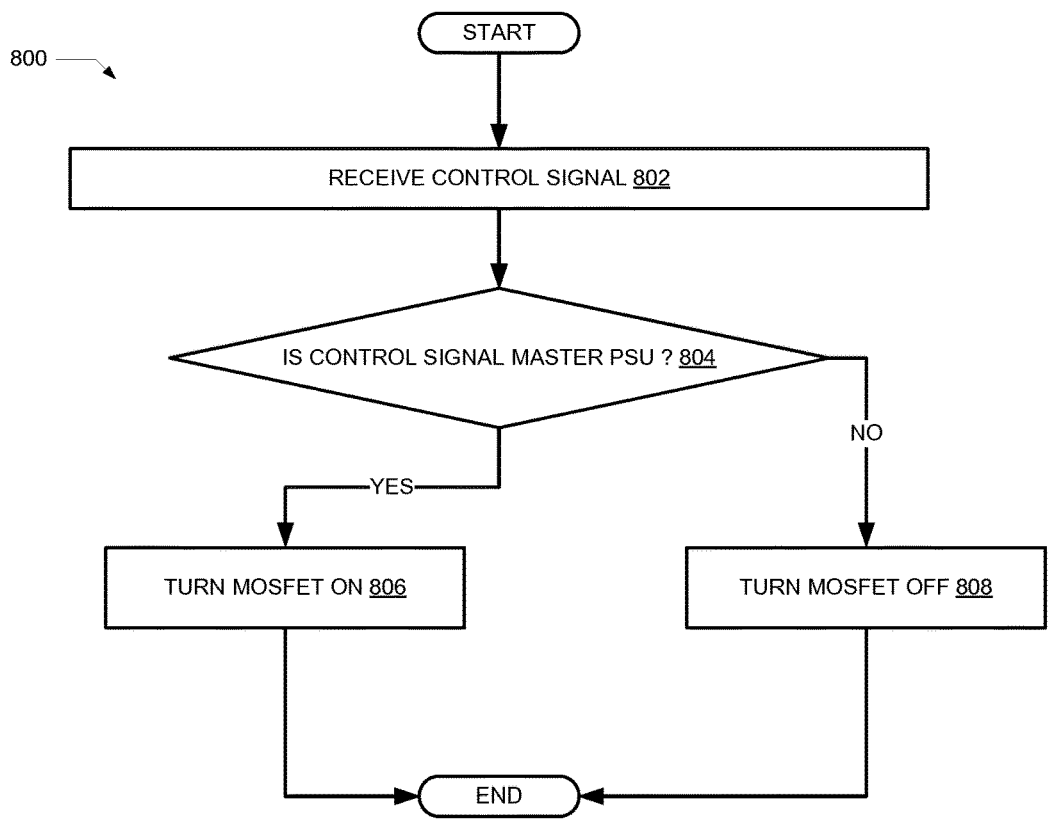
FIG. 8 is a flow chart illustrating one example of the method by which a power supply unit sets the master or slave mode in an IHS, according to one or more embodiments.
Figure 9:
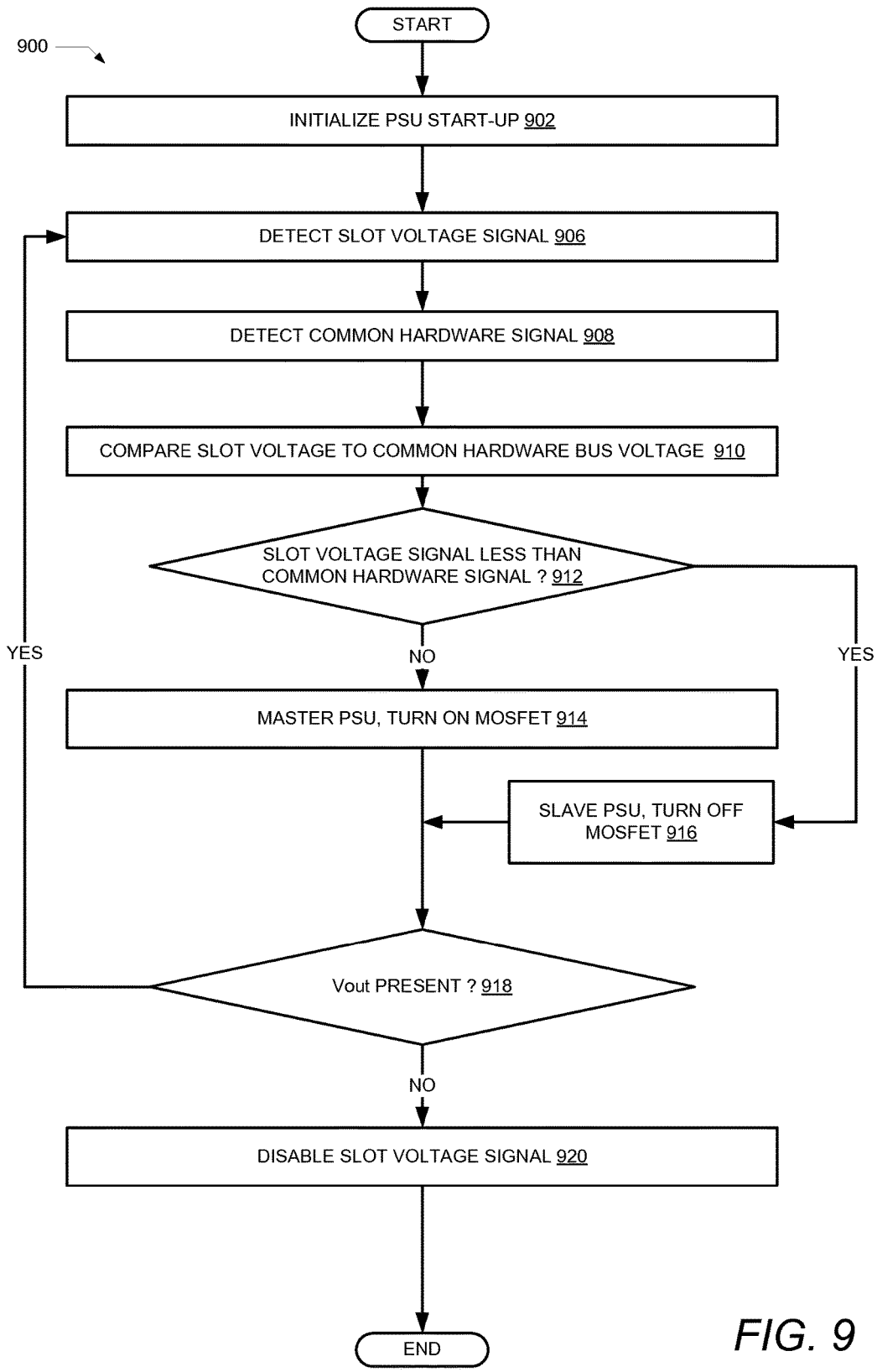
FIG. 9 is a flow chart illustrating one example of the method by which a power supply micro-controller selects master and slave power supplies in an IHS, according to one or more embodiments.

FIGS. 7-9 illustrate flowcharts of exemplary methods 700, 800 and 900 by which MC 110 and micro-controllers 220A-C within the preceding figures performs different aspects of the processes that enable the one or more embodiments of the disclosure. The description of methods 700, 800 and 900 are provided with general reference to the specific components illustrated within the preceding FIGS. 1-6B. Generally method 700 is described as being implemented via MC 110 and particularly the execution of code provided by master PSU firmware 610 within MC 110. Methods 800 and 900 are described as being implemented via micro-controller 220A and particularly the execution of code provided by master PSU firmware 650 within micro-controller 220A. It is however appreciated that certain aspects of the described methods may be implemented via other processing devices and/or execution of other code.

With specific reference to FIG. 7, method 700 begins at the start block and proceeds to block 701 where MC 110 triggers PSUs 130A-C to turn on and initialize after input power has been provided. MC 110 triggers each of the PSUs via communication bus 134 to disable their output on positive Vout terminal 316 (block 702). At block 704, MC 110 retrieves the data identifying the master PSU 622 and slave PSUs 624 from MC memory 114. MC 110 transmits a first control signal identifying one of PSUs as the master PSU (i.e. PSU 130A) and transmits a second control signal identifying the other PSUs as slave PSUs (i.e. PSUs 130B and 130C) (block 705). MC 110 triggers the master PSU 130A to turn on MOSFET 240A and the slave PSUs 130B and 130C to turn off MOSFETs 240B and 240C respectively (block 706), such that the master PSU 130A sets the voltage on the common share bus 250. MC 110 triggers each of the PSUs to enable their output on positive Vout terminal 316 (block 708).

MC 110 receives from each of the PSUs 130A-C an indicator of the operational condition of each of the PSUs (block 710). At decision block 712, MC 110 determines if all of the PSUs have a good operational condition. In response to all of the PSUs having a good operational condition, MC 110 continues to monitor all of the PSUs for good operational condition. In response to at least one of the PSUs 130A-C not having a good operational condition, MC 110 triggers the defective PSUs to shutdown or be disabled (block 714) and determines if the defective PSUs include the master PSU (block 716).

In response to a defective PSU being the master PSU, MC 110 determines a new master PSU (block 718) and transmits a control signal signaling the new master PSU that it is the master PSU (block 720). In one embodiment, MC 110 can randomly select a new master PSU from among the PSUs having a good operational condition. MC 110 triggers the new master PSU to turn on its respective MOSFET 240 (block 722) such that the new master PSU sets the voltage on the common share bus 250. After block 722, at decision block 724, MC 110 checks if input power has been lost to all of the PSUs 130A-C within IHS 100. If input power is still present, MC 110 returns to block 710 and continues receiving the operational condition of the PSUs. If input power has been lost to all of the PSUs, method 700 ends. Method 700 would re-start when input power is re-applied. In response to a defective PSU not being the master PSU, MC 110 continues to monitor whether all of the remaining PSUs have a good operational condition at block 712.

Turning to FIG. 8, method 800 begins at the start block and proceeds to block 802 where micro-controller 220A receives a control signal from MC 110 indicating whether PSU 130A is the master PSU or a slave PSU. At decision block 804, micro-controller 220A determines if the control signal indicates that PSU 130A is a master PSU. In response to the control signal indicating that PSU 130A is a master PSU, micro-controller 220A turns on MOSFET 240A (block 806) such that PSU 130A is the master PSU that sets the voltage on the common share bus 250. Method 800 then terminates. In response to the control signal indicating that PSU 130A is not a master PSU, micro-controller 220A turns off MOSFET 240A (block 808) such that PSU 130A is a slave PSU. Method 800 then ends.

Turning to FIG. 9, method 900 begins at the start block and proceeds to block 902 where micro-controller 220A initializes PSU 402A during start-up, including providing a signal via D/A 510 to the common hardware bus 420. Micro-controller 220A detects the slot voltage at node 526 via A/D 520 (block 906) and detects the voltage on the common hardware bus 420 via circuit line 532 and A/D 520 (block 908). Micro-controller 220A compares the slot voltage at node 526 to the voltage on the common hardware bus 420 (block 910). Micro-controller 220A determines if the slot voltage is less than the voltage on the common hardware bus 420 (decision block 912).

In response to the slot voltage not being less than the voltage on the common hardware bus 420, micro-controller 220A identifies PSU 402A as a master PSU and turns on MOSFET 240A (block 914) such that PSU 402A sets the voltage on the common share bus 250. In response to the slot voltage being less than the voltage on the common hardware bus 420, micro-controller 220A identifies PSU 402A as a slave PSU and turns off MOSFET 240A (block 916). Micro-controller 220A determines if an output voltage is present on positive Vout terminal 316 (decision block 918). If no output voltage is present on positive Vout terminal 316, converter 210A and PSU 402A are not operating or are operating in a defective manner. In response to determining that an output voltage is present on positive Vout terminal 316, micro-controller 220A continues to detect the slot voltage at node 526 via A/D 520 (block 906). In response to determining that an output voltage is not present on positive Vout terminal 316, micro-controller 220A disables the slot voltage signal (block 920). By disabling the slot voltage signal one of the other PSUs (i.e. PSU 402B or 402C) can then become the master PSU. Method 900 then ends.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A power supply system comprising:
    a first power supply including: a first converter for providing a first output voltage; and a first micro-controller coupled to a first switch, the first switch further coupled to a common share bus;
    a second power supply including: a second converter for providing a second output voltage; and a second micro-controller coupled to a second switch, the second switch further coupled to the common share bus;
    wherein the first micro-controller is configured to receive a first control signal designating the first power supply to be either a master power supply or a slave power supply and the second micro-controller is configured to receive a second control signal designating the second power supply to be either the master power supply or the slave power supply; and
    a first control circuit coupled between the first micro-controller and a common hardware signal bus, the first control circuit comprising: a first resistor having a first end coupled to ground and a second end coupled to both a first current source and the first micro-controller; and a diode having a cathode coupled to the first micro-controller and an anode coupled to the common hardware signal bus, and the first control circuit generating the first control signal.

2. The power supply system of claim 1, wherein:
    the first micro-controller turns on the first switch when the first control signal designates the first power supply as the master power supply, such that the first power supply sets the voltage on the common share bus, while the second power supply is designated as the slave power supply and the second switch remains in the off position; and
    the second micro-controller turns on the second switch when the second control signal indicates that the second power supply is to be the master power supply, such that the second power supply sets the voltage on the common share bus, while the first power supply is designated as the slave power supply and the first switch remains in the off position.

3. The power supply system of claim 1, further comprising:
    a management controller coupled to the first and second micro-controllers, the management controller selecting the first and second control signals such that the management controller selects which among the first power supply and the second power supply is set as the master and slave power supplies, respectively.

4. The power supply system of claim 1, further comprising:
    a second control circuit coupled between the second micro-controller and the common hardware signal bus, the second control circuit generating the second control signal; and
    wherein the first micro-controller compares a first control signal voltage to a common hardware signal bus voltage in order to determine if the first power supply is the master or slave power supply.

5. The power supply system of claim 1, further comprising:
    a first precision rectifier coupled between the first micro-controller and the first switch; and
    a second precision rectifier coupled between the second micro-controller and the second switch.

6. The power supply system of claim 5, wherein the first switch comprises one of a gate and a base coupled to the first micro-controller, one of a source and a collector coupled to the first precision rectifier and one of a drain and an emitter coupled to the common share bus.

7. An information handling system (IHS) comprising:
at least one processing node, the processing node having at least one central processing unit (CPU);
a first power supply including a first converter for providing power to the at least one processing node and a first micro-controller coupled to a first switch, the first switch further coupled to a common share bus;
a second power supply including a second converter for providing power to the at least one processing node and a second micro-controller coupled to a second switch, the second switch further coupled to the common share bus;
wherein the first micro-controller is configured to receive a first control signal designating the first power supply to be either a master power supply or a slave power supply and the second micro-controller is configured to receive a second control signal designating the second power supply to be either the master power supply or the slave power supply; and
a first control circuit coupled between the first micro-controller and a common hardware signal bus, the first control circuit comprising: a first resistor having a first end coupled to ground and a second end coupled to both a first current source and the first micro-controller; and a diode having a cathode coupled to the first micro-controller and an anode coupled to the common hardware signal bus, and the first control circuit generating the first control signal.

8. The information handling system of claim 7, wherein:
the first micro-controller turns on the first switch when the first control signal designates the first power supply as the master power supply, such that the first power supply sets the voltage on the common share bus, while the second power supply is designated as the slave power supply and the second switch remains in the off position; and
the second micro-controller turns on the second switch when the second control signal indicates that the second power supply is to be the master power supply, such that the second power supply sets the voltage on the common share bus, while the first power supply is designated as the slave power supply and the first switch remains in the off position.

9. The information handling system of claim 7, further comprising:
a management controller coupled to the first and second micro-controllers, the management controller selecting the first and second control signals such that the management controller selects which among the first power supply and the second power supply is set as the master and slave power supplies, respectively.

10. The information handling system of claim 7, further comprising:
a second control circuit coupled between the second micro-controller and the common hardware signal bus, the second control circuit generating the second control signal; and
wherein the first micro-controller compares a first control signal voltage to a common hardware signal bus voltage in order to determine if the first power supply is the master or slave power supply.

11. The information handling system of claim 7, further comprising:

a first precision rectifier coupled between the first micro-controller and the first switch; and
a second precision rectifier coupled between the second micro-controller and the second switch.

12. The information handling system of claim 7, wherein the first switch comprises one of a gate and a base coupled to the first micro-controller, one of a source and a collector coupled to the first precision rectifier and one of a drain and an emitter coupled to the common share bus.

13. A method of providing power to a device via a power supply system, the method comprising:
receiving, from a first control circuit, a first control signal at a first micro-controller of a first power supply of the power supply system, the power supply system having the first power supply and a second power supply, the first power supply including a first converter for providing a first output voltage, a first micro-controller coupled to a first switch that is further coupled to a common share bus, and the first control circuit coupled between the first micro-controller and a common hardware signal bus, the first control circuit comprising: a first resistor having a first end coupled to ground and a second end coupled to both a first current source and the first micro-controller; and a diode having a cathode coupled to the first micro-controller and an anode coupled to the common hardware signal bus, and the first control circuit generating the first control signal;
determining if the first control signal identifies the first power supply as a master power supply, wherein the first micro-controller is configured to receive the first control signal designating the first power supply to be either a master power supply or a slave power supply;
in response to determining that the first control signal has identified the first power supply as the master power supply, turning on a first switch coupled between the first micro-controller and a common share bus such that the first power supply is configured as a master power supply that sets the voltage on the common share bus.

14. The method of claim 13, further comprising:
in response to determining that the first control signal has not identified the first power supply as the master power supply, turning off the first switch coupled between the first micro-controller and the common share bus such that the first power supply is configured as a slave power supply.

15. The method of claim 13, wherein the first control signal is received from a management controller.

16. The method of claim 13, wherein the first control signal is received from a first control circuit that is coupled between the first micro-controller and a common hardware signal bus.

17. The method of claim 13, further comprising:
comparing a value of the first control signal to a value of a common hardware signal;
determining if the first control signal value is less than the common hardware signal value;
in response to determining that the first control signal value is not less than the common hardware signal value, identifying the first power supply as the master power supply.

18. The method of claim 17, further comprising:
in response to determining that the first control signal value is less than the common hardware signal value, identifying the first power supply as the slave power supply.

* * * * *